June 12, 1928.

E. F. GINGRAS 1,672,884

ICE CREAM CONE PROTECTOR

Filed Nov. 1, 1924

INVENTOR
Edward F. Gingras
By Clarence S. Walker.
His Attorney

Patented June 12, 1928.

1,672,884

UNITED STATES PATENT OFFICE.

EDWARD F. GINGRAS, OF BUFFALO, NEW YORK.

ICE-CREAM-CONE PROTECTOR.

Application filed November 1, 1924. Serial No. 747,348.

This invention relates to an improvement in an ice cream cone protector and more particularly to the provision in such a protector of means by which the protector can be easily mutilated to permit the withdrawal of the cone and further to the provision with the protector of a cap which is suitably secured in place so the cone and its contents are completely enclosed.

The present manner of serving ice cream cones at public gatherings is not sanitary since the cones and their contents are exposed to dust and other impurities and liable to be contaminated by handling by the vendor or the purchaser. Furthermore, if the cone be enclosed in an ordinary conical holder it is difficult to remove the holder as the cone is being consumed.

The chief object of this invention is to provide a protector for an ice cream cone by which the cone is enclosed and which has portions that can be quickly torn away so that the protector can be mutilated sufficiently to permit the easy withdrawal of the cone itself.

A further object of the invention is to provide in combination with such protector a cap which completely covers the contents of the cone and which is removably held in position by means of the portions of the protector adapted to be torn away.

Other objects of this invention will appear from a consideration of the specification taken in connection with the accompanying drawing which forms a part thereof and in which Figure 1 is a side elevation of a protector and cap for an ice cream cone;

Figure 4:
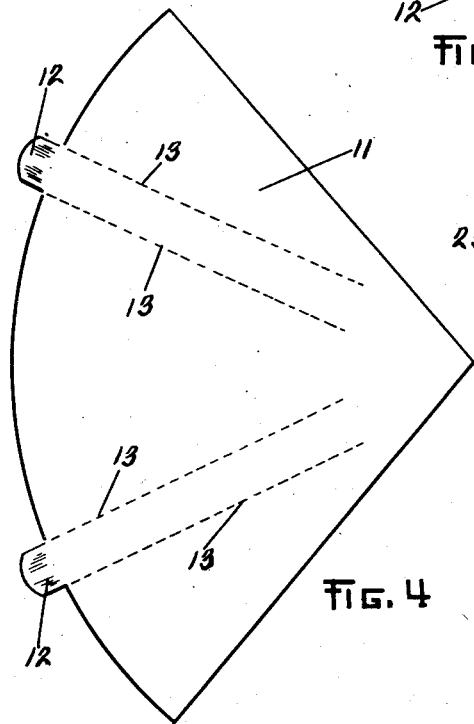
Fig. 4 is a view of the blank from which the protector or of Figs. 1, 2 and 3 is made.

In the drawing the reference numeral 10 is used to designate a protector for an ice cream cone. This protector is made of substantially the same dimensions as the cone so that when the cone is inserted its sides will be completely covered and protected from impurities. The protector 10 is made from a fan-shaped blank 11, shown in Fig. 4, and is provided at its upper edge with a plurality of tabs 12, extensions of which appear in the weakened lines 13 which extend down into the blank. In the present embodiment, two diametrically placed tabs 12 are provided and the lines 13 are normal to the outer edge of the blank but it is obvious that this number and arrangement can be changed as desired without going beyond the scope of this invention.

Figure 1:
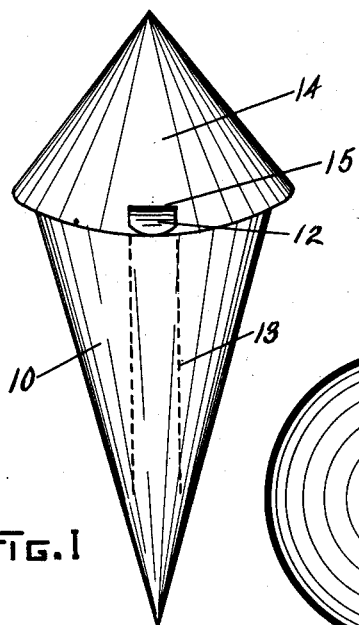
Figure 2:
Fig. 2 is a plan view thereof.
Figure 3:
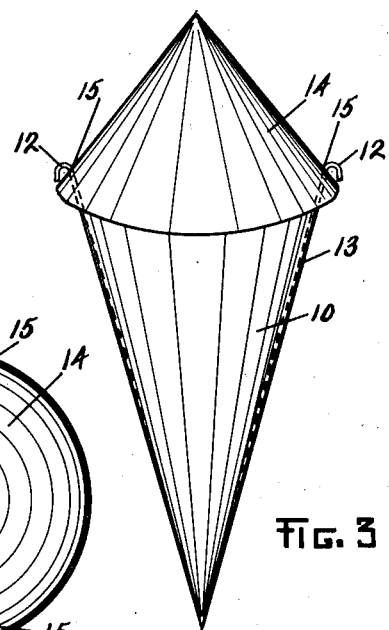
Figure 3 is a view at right angles to Fig. 1 illustrating more clearly the manner in which the cap is secured to the cone protector.

In order to protect the contents of the cone and to form a complete closure therefor, a cap 14 is provided having slots 15 suitably arranged with reference to the tabs 12 so that when the cap is placed upon the holder the tabs 12 will extend through the slots. By bending over the projecting tabs 12 the cap is easily held in place, as shown clearly in Fig. 3. It will be noted that the slots 15 in the cap are near the edge so that if desired the cap can be inverted and used as a saucer.

Figure 5:
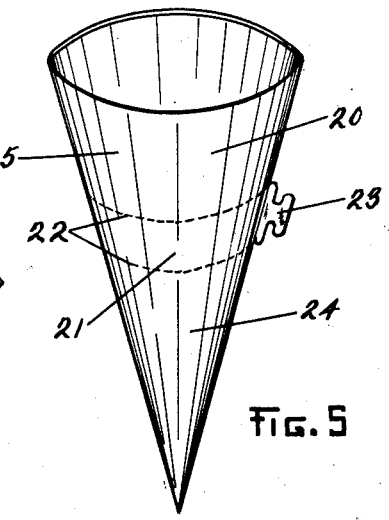
Fig. 5 is a view of another form of protector that may be used if desired.

The protector 20 shown in Fig. 5 differs from that previously described by the arrangement of the weakened portion. There the protector is provided with an annular band 21 defined by the weakened lines 22 and terminating in a tab 23 which projects beyond the surface of the protector so that it can be easily grasped. By pulling upon the tab 23 the portion 21 will be removed, the protector breaking along the weakened lines 22, so that there will be left a lower portion 24 and an upper portion 25 both of which still enclose the cone. After the portion 21 has been removed the upper portion 25 can be pushed down over the cone and the lower portion 24 which can be retained as a guard or holder until the cone has been consumed as far as its edge. When this takes place the cone can easily be raised from the lower portion 24 by pinching the bottom and thus forcing the cone to rise until sufficient portion of the edge has been exposed so that it can be easily grasped and removed from the holder.

The cones are preferably supplied enclosed in the protectors so that, when being filled, the cone itself need not be handled. The caps 14 are preferably supplied separately to the vendor and are placed over the contents as soon as the cones are filled. Advertising matter may be placed upon the exposed surface of the cap which will not interfere with its use as a saucer.

While certain embodiments of this invention have been shown and described, I am not to be limited thereto since it is obvious that others may be made without departing from the spirit and scope of the invention as set forth in the following claim.

Having thus set forth my invention what I claim as new and for which I desire protection by Letters Patent is:

The combination with an ice cream cone protector having projecting tabs and weakened lines in said protector forming extensions of said tabs, of a cap enclosing the contents of said cone and having slots through which said tabs project when said cap is applied to secure said cap in position said weakened lines facilitating the mutilation of said protector when said tabs are pulled upon.

In testimony whereof I have affixed my signature.

EDWARD F. GINGRAS.